Aug. 20, 1940.  H. S. JANDUS  2,211,820
BUMPER STRUCTURE
Filed June 23, 1938
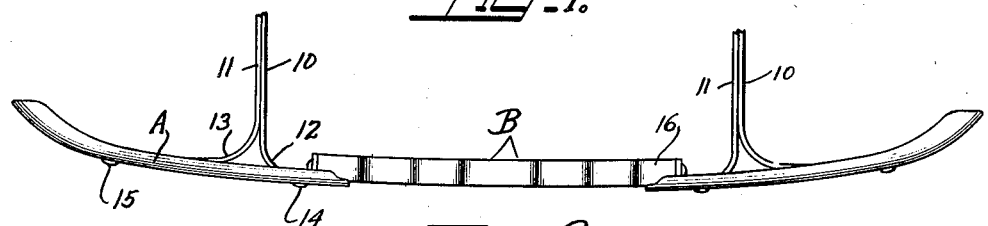
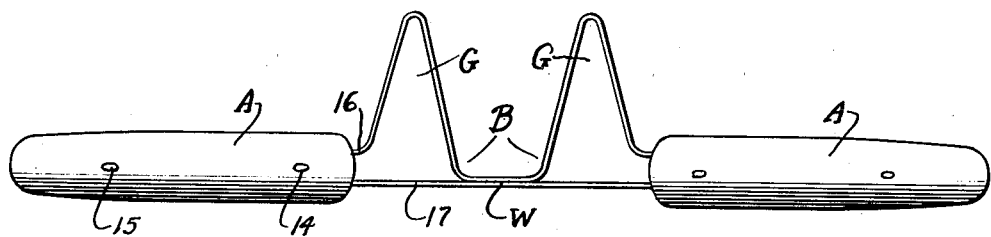
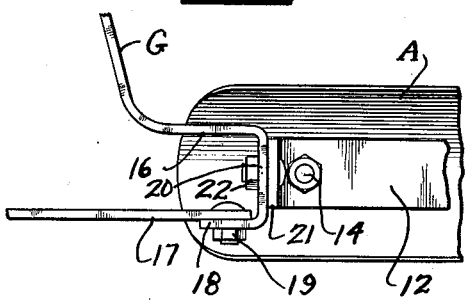
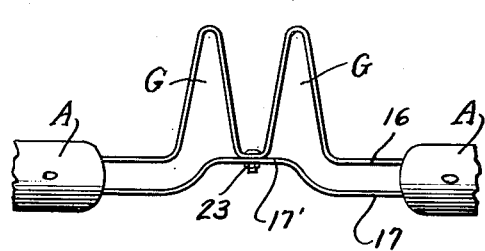
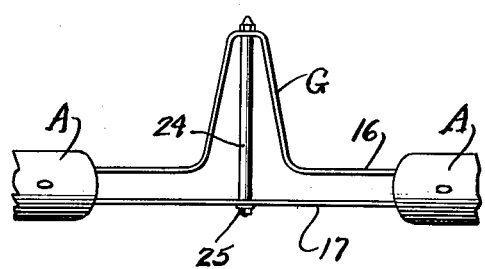
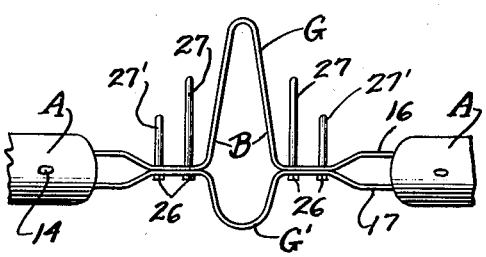
Inventor
HERBERT S. JANDUS.

Patented Aug. 20, 1940

2,211,820

UNITED STATES PATENT OFFICE 2,211,820

BUMPER STRUCTURE

Herbert S. Jandus, Detroit, Mich., assignor, by mesne assignments, to Houdaille-Hershey Corporation, Detroit, Mich., a corporation of Michigan Application June 23, 1938, Serial No. 215,316

1 Claim. (Cl. 293—55)

This invention relates to bumper structures for automobiles and covers improvements over the bumper structures disclosed in my copending application Serial No. 186,045 filed January 21, 1938. In this type of bumper, the middle portion of the impact bar structure is in the form of flat bars set edgewise so as to afford the least obstruction to air flow through the radiator, and the upper flat bar is deflected upwardly to form a guard extension in front of the radiator and the radiator grille in order to protect the radiator structure against bumps by bumpers of other automobiles.

The important object of the present invention is to increase the rigidity and strength of the bumper impact bar structure, particularly the middle or flat horizontal bar construction, this being preferably accomplished by rigidly securing the flat horizontal bars together at one or more intermediate points.

The various features of the invention are shown incorporated in the structure of the drawing, in which drawing:

Figure 1 is a plan view of the bumper structure and its supporting hanger bars;

Figure 2 is a front elevation;

Figure 3 is an enlarged rear view showing the connection of the middle portion of the bumper structure with the end portions thereof;

Figures 4, 5 and 6 are views like Figure 2 but showing modified structures and arrangements.

On the structures shown, the impact element of the bumper structure comprises the outer portions A and the middle or intermediate portion B. The end portions A may be of the ordinary construction in the form of bars arranged substantially in a vertical plane and transversely curved and convexed forwardly.

The hanger or supporting structure shown comprises inner and outer bars 10 and 11 adapted to be secured at their inner ends to the vehicle chassis and extending forwardly and having the laterally inwardly and outwardly deflected ends 12 and 13, the impact end portions A being secured to the ends 12 as by means of bolts 14 and 15 respectively.

The inner portion B of the impact structure consists of one or more bars arranged edgewise or in substantially horizontal planes, one above the other, two such bars 16 and 17 being shown. The middle portion B may be secured and supported in the manner disclosed in my copending application referred to. As shown by Figure 3, the upper bar 16 at its ends is deflected downwardly and a distance inwardly to U-shape, the short legs 18 forming seats for the lower bar 17 to which the bar is secured as by bolts 19, or in any other suitable manner. The yoke portions 20 of the U bends of the upper bar are in alignment with the rearwardly deflected ends 21 of the inwardly deflected outer part 12 of the hanger bars 10, and are secured thereto as by bolts 22 so that the end portions A and the middle portion B are rigidly secured together and to the hanger bar structure.

The middle portion B of the bumper structure, by virtue of the edgewise disposed horizontal bars, lends rigidity and strength to the bumper structure and will not interfere with the free flow of air through the radiator. To add further protection for the radiator structure, the upper bar 16 may be deflected vertically upwardly to provide guard loops G, two such loops being shown on Figures 1 and 2, these loops extending in front of the radiator structure and a distance above the lower end thereof. To strengthen the guard loops, the portion of the bar 16 between the guard loops is rigidly secured to the lower bar 17. In the arrangement of Figures 1 and 2 the lower bar 17 remains straight and the portion of the bar 16 between the guard loop is extended downwardly for engagement with the bar 17 and is rigidly secured thereto as by welding W. The resistance of the guard loops G to bumps is thus materially increased.

In the arrangement shown in Figure 4, the upper horizontal bar is deflected to form two guard loops G and the middle portion 17' of the lower bar 17 is deflected upwardly to be rigidly secured, as by a bolt 23, to the portion of the bar 16 between the loops G.

In the modified arrangement of Figure 5, the lower horizontal bar 17 remains straight and the upper horizontal bar 16 is deflected vertically upwardly at its middle to form the guard loop G. A post 24 is interposed between the lower bar 17 and the bend of the guard loop and, as shown, the post may be a length of tubing having a bolt 25 extending therethrough for securing it to the bars. This post construction will increase the impact surface of the guard loop structure and will also strengthen and increase its resistance to bumps.

In the modified arrangement of Figure 6, the upper horizontal bar 16 has its middle portion deflected upwardly to form a comparatively long guard loop G, while the lower horizontal bar 17 has its middle portion deflected downwardly to form a shorter guard loop G', the guard loops being in vertical alignment. Adjacent to the loops, the bars are deflected into engagement with each other and are rigidly secured together as by bolts 26. As shown, the bolts are projected upwardly through the engaging portions of the bars and the nuts for the bolts may be in the form of rods or posts 27 extending vertically upwardly. These posts may be of different lengths. As shown, the inner posts 27 are longer than the outer posts 27' and these posts, together with the upper guard loop G, form a guard or fender structure for preventing engagement with the radiator or radiator grille of the automobile by the bumpers on other automobiles.

I thus provide a strong and rigid unitary bumper impact bar structure of which the middle portion in front of the radiator structure is shaped to afford adequate guard structure for the radiator without interfering with the proper flow of air through the radiator.

Although I have shown practical and efficient embodiments of the invention, I do not desire to be limited to the exact structure and arrangement shown and described, as changes and modifications may be made without departing from the scope of the invention.

I claim as follows:

An automobile bumper impact bar structure comprising separated end bars arranged in substantially vertical planes, upper and lower intermediate bars arranged edgewise in horizontal planes and interposed between said end bars and having their outer ends vertically displaced and secured to the inner ends of said end bars, the middle portions of said upper and lower bars being intimately welded together and the portions of the upper bar between its ends and middle portion being bent upwardly to inverted V-shape to form guards for extending in front of the radiator of the vehicle to which the impact bar structure is applied.

HERBERT S. JANDUS.